UNITED STATES PATENT OFFICE.

WILLY TROPP, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

RED WOOL-DYESTUFF.

1,123,430.  Specification of Letters Patent.  Patented Jan. 5, 1915.

No Drawing.  Application filed February 18, 1914. Serial No. 819,344.

*To all whom it may concern:*

Be it known that I, WILLY TROPP, Ph. D., chemist, a citizen of the Empire of Germany, residing at Höchst-on-the-Main, Germany, have invented certain new and useful Improvements in Red Wool-Dyestuffs, of which the following is a specification.

I have found that a red wool-dyestuff of remarkable fastness to light can be obtained by acetylating the dyestuff of the formula:

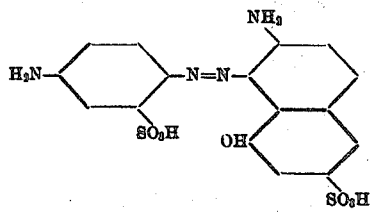

obtainable, for instance, by reducing in alkaline solution the dyestuff obtained by combining p-nitranilin-o-sulfonic acid with 2.8.6.aminonaphtholsulfonic acid (see German Patent No. 95856). The new dyestuff thus obtainable is distinguished from the parent product by the tint it dyes, by its greater leveling power and by a considerably improved fastness to light. The procedure for preparing said dyestuff may, for instance, be as follows: 48 kilos of the dyestuff, obtainable by reducing in alkaline solution the dyestuff derived from p-nitranilin-o-sulfonic acid with 2.8.6. aminonaphtholsulfonic acid, are dissolved in 300 liters of water and to this solution are added 12 kilos of acetic anhydrid while well stirring at 45° C. The temperature rises to about 49° C. at which it is kept for ¼ hour. The dyestuff is then slowly precipitated by means of 75 kilos of common salt. It separates in the form of crystals of a bronze color and after cooling it is pressed and dried.

The dyestuff having the formula—

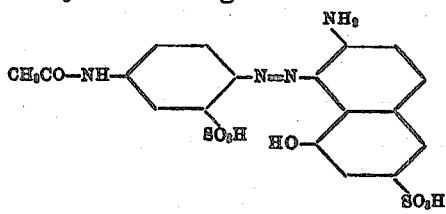

is in the shape of its sodium salt a reddish-brown powder of a metallic luster, it is soluble in water with a red color, scarcely soluble in concentrated sulfuric acid with a red color. On reduction with stannous chlorid and hydrochloric acid it yields on the one hand 1.2 diamino-8-oxynaphthalene-6-sulfonic acid, and on the other hand, while eliminating the acetyl group, p-phenylenediaminsulfonic acid.

Having now described my invention what I claim is:

As a new article of manufacture, the dyestuff of the formula:

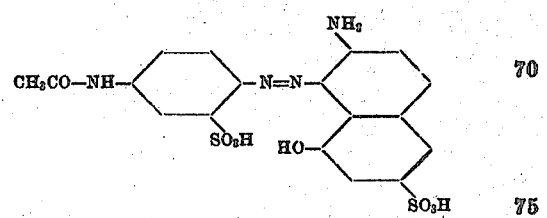

being in the form of its sodium salt a reddish-brown powder of a metallic luster, soluble in water with a red color, scarcely soluble in concentrated sulfuric acid with a red color, yielding on reduction with stannous chlorid and hydrochloric acid on the one hand 1.2-diamino-8-oxynaphthalene-6-sulfonic acid, and on the other hand, while eliminating the acetyl group, p-phenylenediaminsulfonic acid, dyeing wool even red tints of excellent fastness to light.

In testimony whereof I affix my signature in presence of two witnesses.

WILLY TROPP.

Witnesses:
  JEAN GRUND,
  CARL GRUND.